C. B. HAYWARD.
INDICATING VALVE.
APPLICATION FILED MAY 7, 1917.

1,294,458. Patented Feb. 18, 1919.

Inventor
Clarence B. Hayward,
Attorney

UNITED STATES PATENT OFFICE.

CLARENCE B. HAYWARD, OF NEW HAVEN, CONNECTICUT.

INDICATING-VALVE.

1,294,458.  Specification of Letters Patent.  Patented Feb. 18, 1919.

Application filed May 7, 1917. Serial No. 166,805.

*To all whom it may concern:*

Be it known that I, CLARENCE B. HAYWARD, a citizen of the United States, residing at New Haven, in the county of New Haven and State of Connecticut, have invented certain new and useful Improvements in Indicating-Valves, of which the following is a specification, reference being had therein to the accompanying drawings.

This invention has relation to automatically actuated valves arranged to operate when air pressure or the like confined in a space falls below a given point.

The invention is applicable for use with inflated tires and will hereinafter be described in this connection, but it is to be understood, however, that it may, wholly or partly, be used in other connections, for instance, with the reservoir of an air brake system.

A part of the invention consists of a device for giving an audible indication when the valve is opened upon the fall of pressure below the given point, but if desired, in some instances, a contactor may be actuated to open an electric circuit for the purpose of operating a visual signal at a distant point, or to supply energy to an electric motor driving a pump, which would restore the required pressure to close the valve and break the electric circuit.

In carrying out one embodiment of the invention the same consists in part of a valve-body, a valve which is held in a closed position by the air pressure up to a given point against a force which tends to open the valve, the opening of the valve allowing air to escape through a by-passage having therein a device arranged to be vibrated or otherwise moved by the escaping air, and by means provided, said by-passage is closed when pressure is to be restored. And further, means are provided whereby the valve may readily be used as an ordinary tire valve, with a pressure indicating gage thereon.

All the above features, together with details of construction forming part of my invention, will be hereinafter described with reference to the accompanying drawings, in which,—

Figures 1, 2:
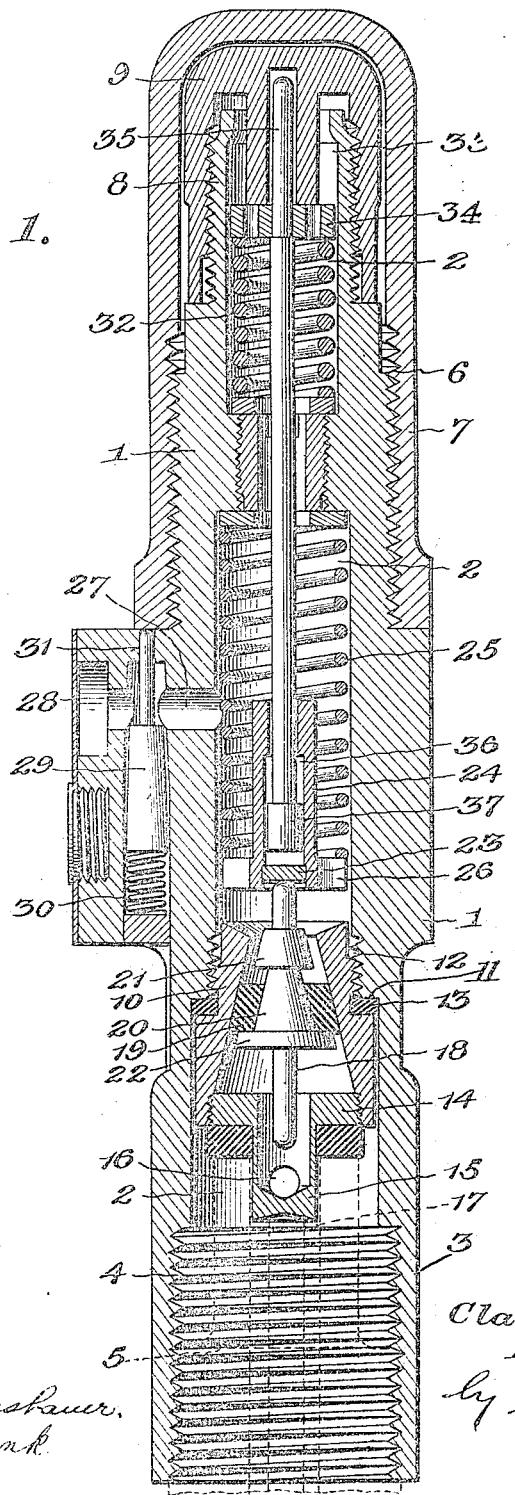
Figure 1 is a longitudinal, sectional view of the complete valve.
Fig. 2 is a detail, sectional view of the valve proper and some of the adjacent parts.

Referring to the drawings,—1 is the valve-body, having a main air passage through a longitudinal bore 2 and a base 3 internally threaded at 4 to fit, for example, on the valve stem 5 of a tire, such a stem being shown in dotted lines. The valve-body 1 is externally threaded at 6 to receive an outer cap 7 and at the reduced portion 8 of the valve body external threads are provided to receive the inner cap 9.

The valve seat 10 is a member separable from the valve body and is screwed tightly in place against the shoulder 11 on internal threads 12, the gasket 13 being interposed between the shoulder 11 and a shoulder portion of the seating 10 to insure a tight joint. The bore of this seating is conical and the lower end thereof is closed by means of a head 14 having a depending shank 15, which is made hollow to receive the lower end of the valve stem and said shank is closed at the bottom, an orifice 16 being provided therein for the passage of air. The depending shank 15 abuts against and opens the ordinary tire valve stem 17 shown in dotted lines.

The valve stem or carrier 18, forming part of the present invention, consists of a member carrying a valve disk 19 composed of a suitable material, preferably rubber, which is capable of expanding and contracting, its expansion laterally being effected by the cone 20 on which the disk 19 is seated. This disk lies between two heads or stops 21 and 22, which heads limit an independent movement allowed between the valve carrier and said disk. When the valve is open, as shown in Fig. 2, the valve disk 19 and stem 18 are out of contact with the adjacent parts, except that the upper end of the stem is in contact with an abutment 23 carried by the bunter head 24.

In the open position of the valve, the latter and its carrier, are practically unsupported; consequently what may be termed a substantially floating movement is allowed to those parts, thereby insuring that the passage around the valve proper is completely open when the parts actuating the valve have been operated to open same. Furthermore, on account of the surface engaged being greater, the disk is more inclined to adhere to its seat than to the cone 20. Consequently, the cone will move away so that the disk will rest on the restricted portion of the cone and then said disk can contract, the disk being, however, kept within a limited range of movement between the heads 21 and 22.

The valve is kept in its closed position by pressure of the air below the valve and the compression spring 25 acting on the bunter head 24 transmitting pressure above the valve has a tendency to open the valve, but the capacity of the spring 25 is such that it will not overcome the force of the air pressure until such pressure falls below a predetermined point. When the pressure does fall below such point, the valve stem is pushed down by the bunter head and the valve is opened, the air escaping through a by-passage 27 and not through the main passage which is closed by the cap 9. The escaping air vibrates the diaphragm 28 causing an audible sound, indicating that pressure in the tire has fallen below said predetermined point.

To restore the air pressure, the outer cap 7 must first be removed bodily, and such action closing the by-passage 27 by means of the slide valve 29, which is actuated by spring 30 when pin 31 is released upon the removal of the cap 7 only part way. The inner cap 9 is then removed from the valve body allowing the compression spring 32 to extend toward the point 33 forcing before it the shouldered bushing 34, which is secured to the bunter pin 35. This bunter pin is actuated by releasing the spring 32, thus allowing the bunter pin head 37 to engage the shoulder 36 of bunter 24 and pull the latter away from the valve stem against the weaker spring 25, allowing the valve to close and the stem of its carrier to be free from contact with the bunter thus preventing the spring 25 from performing its function as heretofore described.

When the valve and other parts are in the position last described the valve complete can be used similar to the usual valve stem of a tire, meaning that an ordinary pump can be attached to the valve body and air forced into the tire, past the valve proper which will open and close, according to which side the pressure is greater, and when the valve is so arranged an ordinary pressure gage can be secured on the threaded portion 8.

It is obvious that the benefits of the present invention may be obtained without employing all the parts thereof, for example the compression spring 32 together with the inner cap 9 and the parts relating particularly thereto may be omitted if the interchangeability to an ordinary valve is not desired. Such and other part use of the invention and modifications thereof are included within the scope of the invention as defined in the appended claims.

Having described my invention, what I claim as new, and desire to secure by Letters Patent, is—

1. In a device of the character described; a body portion having a main passage therein and a by-passage normally open and leading from the main passage; a cap or cover connected with said body member; and means, automatically operated when said cap or cover is partly removed, for closing said by-passage.

2. In a device of the character described; a body portion having a main passage and a by-passage; a valve for each of said passages; a cap or cover controlling the operation of a device which closes the valve for the by-passage; and a movable element operated by air passing through the by-passage.

3. In a device of the character described; a body portion having a main passage and a by-passage therein; a cap or cover for said main passage; a valve in said main passage automatically opened when pressure falls below a given point; a device in said by-passage vibrated by escaping air; and a valve for said by-passage which is opened and closed according to the position of said cap or cover.

4. In a device of the character described; a body portion having a main passage and a by-passage; a removable cap; a conical valve seat in the main passage; a valve carrier supporting an expansive valve disk; means operating automatically at a predetermined time for positively moving said carrier to allow contraction of said valve disk to open the main passage allowing air to escape through the by-passage; and a valve for the latter passage closing automatically when said cap is removed.

5. In a device of the character described; a body portion having a main passage and a by-passage; a valve for each passage; means for positively opening the main passage valve at a predetermined time; counteracting means when released rendering the said valve operating means ineffective; an outer and an inner cap on the body portion, the outer cap controlling the valve for the by-passage and the inner cap controlling said counter-acting means.

6. In a device of the character described; a valve operating and controlling mechanism, comprising a bunter head having independent movement relatively to a bunter pin under the action of an actuating spring; and a controlling spring of a greater capacity than the actuating spring, which controlling spring, when released, prevents said independent movement of the bunter head and renders the actuating spring inoperative.

7. In a device of the character described; a body portion having a main passage therein and a by-passage communicating with said main passage; a valve for said by-passage; a detachable cover on said body portion; and means, released by the movement of said cover, for automatically closing said valve.

8. In a device of the character described; a body portion having a longitudinal passage therein and a by-passage communicating therewith; a conical valve seat in said longitudinal passage; a loosely mounted valve carrier within said seat having a substantially floating movement when the valve is opened; automatic actuating means comprising a spring controlled member bearing on said carrier for opening said valve; means, including a cap and a dust cover, which must be manipulated to manually open said valve; a valve in said by-passage; and means controlled by said dust cover for closing the latter valve.

9. In a device of the character described; a body portion having a main passage and a by-passage with a valve and seat therefor in each passage; an inner and an outer cover for said main passage; means for automatically opening the main passage valve at a predetermined time; counter-acting means controlled by said inner cover when released, rendering said valve operating means ineffective; and means whereby the by-passage valve is closed when said outer cover is wholly or partly removed.

10. In a device of the character described; a body portion having a main air passage and a by-passage communicating therewith; an inlet or inflation valve in said main passage; an outlet or deflation valve in said by-passage; compression means tending to open said main passage inlet valve; counter-acting means when released rendering said compression means ineffective; an inner cap covering said counteracting means; a cover inclosing said cap; and means for closing said outlet valve released by removal of said cover.

11. In a device of the character described; a body portion having a longitudinal passage and a by-passage therein; a valve element and means for actuating the same within said longitudinal passage; caps closing said main passage; and a valve in said by-passage normally held open by one of said caps.

In testimony whereof I have hereunto affixed my signature.

CLARENCE B. HAYWARD.